United States Patent

Simpson

[15] 3,703,203
[45] Nov. 21, 1972

[54] RADIAL WIRE TIRE HAVING IMPROVED SIDEWALL CUT RESISTANCE

[72] Inventor: Robert O. Simpson, Cuyahoga Falls, Ohio

[73] Assignee: The Goodyear Tire & Rubber Company, Akron, Ohio

[22] Filed: June 12, 1970

[21] Appl. No.: 45,680

[52] U.S. Cl....................................152/354, 152/359
[51] Int. Cl..............................................B60c 19/12
[58] Field of Search......152/354, 355, 356, 357, 359, 152/353

[56] References Cited

UNITED STATES PATENTS

| | | | |
|---|---|---|---|
| 3,435,875 | 4/1969 | Devienne | 152/356 |
| 3,077,915 | 2/1963 | Weber | 152/355 |
| 3,050,098 | 8/1962 | Grote | 152/354 |
| 3,442,315 | 5/1969 | Mirtain | 152/354 |
| 3,464,477 | 9/1969 | Verdier | 152/353 |

*Primary Examiner*—Gerald M. Forlenza
*Assistant Examiner*—Robert Saifer
*Attorney*—F. W. Brunner and Michael L. Gill

[57] ABSTRACT

Radial wire tire having four plies of unstretched nylon tire cord fabric disposed in the sidewalls thereof midway between the wire carcass and the outer surface of the sidewall at an angle of between 80° and 88° and extending substantially from the bead portion to the shoulder portion of the tire.

The foregoing abstract is not to be taken as limiting the invention of this application, and in order to understand the full nature and extent of the technical disclosure of this application, reference must be made to the accompanying drawing and the following detailed description.

6 Claims, 3 Drawing Figures

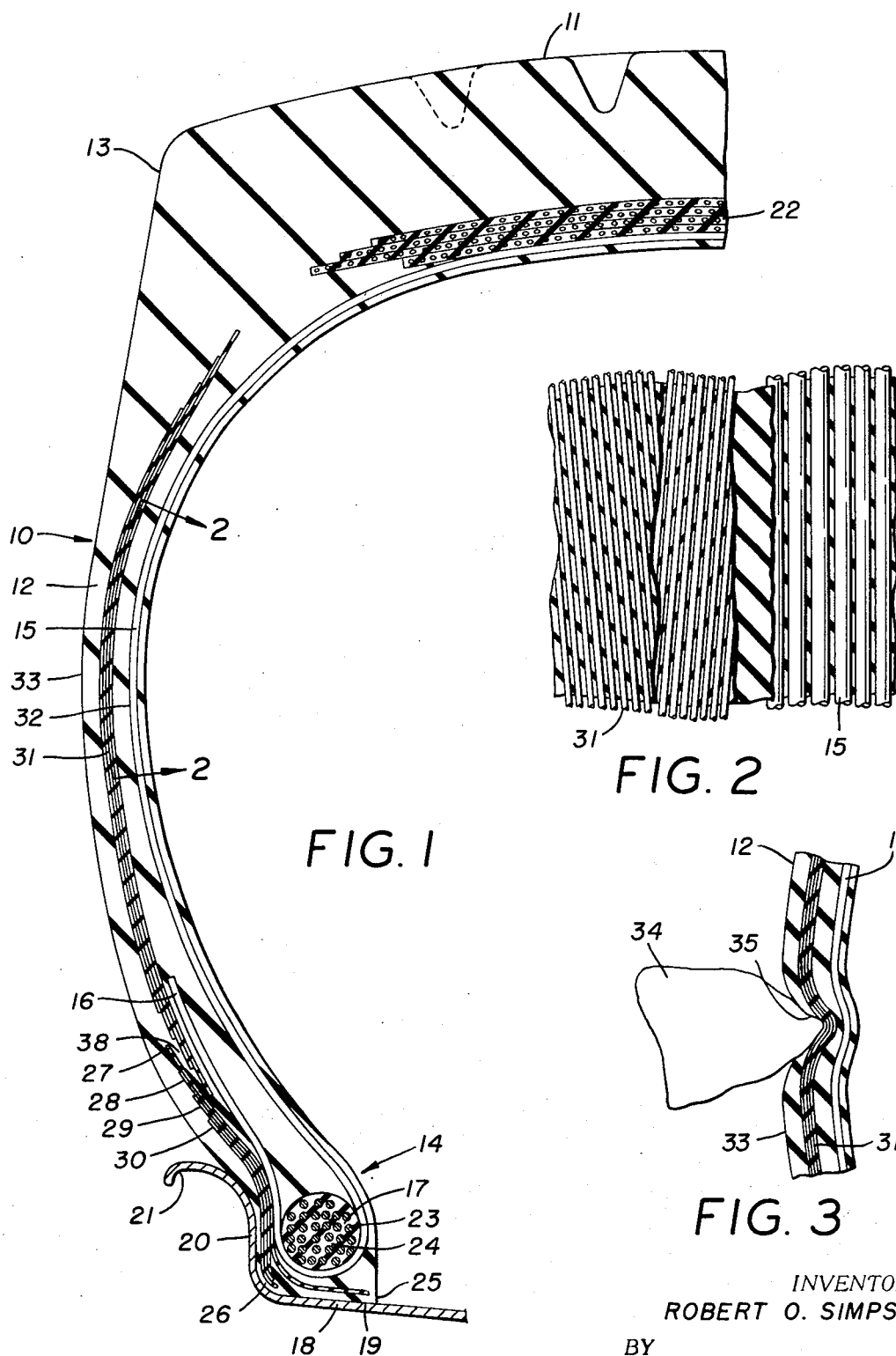

RADIAL WIRE TIRE HAVING IMPROVED SIDEWALL CUT RESISTANCE

This invention relates to pneumatic tires and more particularly to radial wire tires intended for off-the-road use.

Tires having one or more radial wire carcass plies find particular utility on large earthmoving equipment for off-the-road use. Their strength and sidewall flexibility make them very useful for heavy loads over rough terrain. Such tires, however, can be susceptible to sidewall cuts by rocks and other sharp objects. When such a rock or sharp object penetrates the sidewall, moisture and air can cause rusting, or deterioration of the wire carcass ply, or the rock or sharp object can actually break some of the radial wire cords. When this situation occurs, repair becomes difficult if not impossible.

It is, therefore, an object of this invention to provide a radial wire tire having increased resistance to sidewall bruises and cut penetration without adversely affecting the flexibility of the sidewalls.

It is a further object of this invention to provide a sidewall in a radial wire tire that can be repaired when damaged by rocks or other objects.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

FIG. 1 is a fragmentary cross-sectional view of a tire constructed in accordance with this invention taken parallel to the rotational axis;

FIG. 2 is a sectional view of a portion of the tire of FIG. 1 taken substantially along line 2—2 of FIG. 1; and FIG. 3 is a cross-sectional view of a portion of the sidewall of the tire of FIG. 1 taken parallel to the rotational axis of the tire.

With reference to the drawing and in particular FIG. 1, there is illustrated a portion of a tire 10 constructed in accordance with this invention. While only one-half of a tire section is illustrated it is to be understood that the half not illustrated is the same as that illustrated but opposite in hand. The tire 10 comprises a ground engaging tread portion 11 which extends circumferentially of the tire 10 and a sidewall portion 12 which extends from each lateral edge of the tread 11 or shoulder 13 radially inwardly to a bead portion 14. A carcass 15 extends circumferentially about the tire 10 beneath the tread 11 and radially inwardly to the bead portion 14. The carcass 15 has its radially inner end or turn-up portion 16 turned up and about an inextensible bead core 17. In the specific embodiment illustrated the turn-up portion 16 of the carcass 15 is displaced axially from the remaining portion of the carcass 15 for the entire extent of the turn-up portion 16. That is to say the turn-up portion 16 never curves back axially toward the remaining portion or strength portion of the carcass 15 to the extent that it touches or comes into close proximity with the carcass 15.

When the tire 10 is in normal operation the bead portion 14 is mounted or seated on a rim 18. The rim 18 has a base 19 which engages and supports the radially inner side of the bead portion 14 and a flange 20 which extends radially outwardly from the base 19 and engages the axially outer side of the bead portion 14. The radially outer end of the flange 20 curves smoothly away from the bead portion 14 to form a rounded lip 21.

In the particular embodiment illustrated, the carcass 15 comprises a single ply of radial wire tire cords which form an angle of substantially 90° with respect to the mid-circumferential centerplane at said centerplane. For purposes of this invention, however, a radial ply tire shall include tires whose cords form an angle of between 80° and 90° with respect to the mid-circumferential centerplane at said centerplane. The mid-circumferential centerplane is a plane which is perpendicular to the rotational axis of the tire and is disposed midway between the shoulders 13 of the tread 11. Four belt plies 22 extend circumferentially about the tire 10 and are disposed radially outwardly of the carcass 15 beneath the tread 11.

The bead portion 14 contains the annular bead core 17 which comprises a plurality of circumferentially extending inextensible wires 23 embedded in a matrix 24 of hard rubber. The bead portion terminates at a toe 25 at its radially, axially innermost edge and at a heel 26 at its radially innermost, axially outermost edge. A first chipper ply 27 extends circumferentially of the tire, and about the bead core 17 from the toe 25, past the heel 26 to a point radially outwardly of the lip 21. Second, third and fourth chipper strips 28, 29, 30 are disposed successively axially outwardly of the first chipper ply 27 and extend radially outwardly from the area of the heel 26. Each chipper ply 28, 29, 30, respectively, terminates at a point radially inwardly with respect to the radially outer end of the next adjacent axially inner chipper ply. All four chipper plies 27, 28, 29, 30 are separated from the turn-up 16 at the portion thereof which is radially outwardly of the lip 21 by a wedge of rubber 38 which may be of the same hardness as the sidewall 12.

In the particular embodiment illustrated, there is one single ply of radial wire tire cord which extends circumferentially of the tire and from the tread portion to the bead portion 14. The turned up ends 16 of the carcass ply 15 extend substantially radially outwardly beyond the lip 21 of the rim 18.

In accordance with the present invention a plurality of barrier plies 31 are located in each sidewall and extend radially in both directions substantially to the respective bead portion 14 and shoulder 13. The barrier plies 31 are disposed midway between the outer surface 32 of the carcass ply 15 and the outer surface 33 of the tire sidewall 12. In the particular embodiment illustrated the barrier layer comprises four plies of unstretched nylon tire cord fabric having a cord angle of approximately 85°.

Nylon tire cord is normally made by spinning molten polymer into filaments which are then cooled and combined into a yarn. The yarn is then stretched or drawn approximately 500% to orient the molecules and then heat set to regulate the crystallinity. The yarn is then twisted to form a ply and two or more plies are twisted to form a cord. This cord is known in the art as "-greige" cord. The nylon cord is then further processed by the tire manufacturer by stretching it at an elevated temperature. For purposes of this invention "unstretched" nylon cords shall mean "greige" nylon cords, or nylon cords which have not been stretched at an elevated temperature after being formed into cords.

For purposes of this invention, the "cord angle" of a barrier ply shall be the acute angle between a cord in the barrier ply and a line passing through the cord which is tangent to a circle at the point of intersection of the line and the cord when said circle lies in a plane which is perpendicular to the rotational axis of the tire with its center on the rotational axis of the tire.

Each successive barrier ply alternates in angle with respect to each succeeding barrier ply. The nylon tire cord being unstretched has a low modulus of elasticity. This physical property of elastic or extensible cords combined with the relatively high cord angle results in the barrier layer 31 not having an appreciable effect on sidewall flexibility. At the same time, the fact that the cords in the barrier layer 31 are crossed with respect to cords in adjacent plies in the barrier layer provides an effective barrier to prevent the penetration of the cords by rocks or sharp objects. The high strength and ability to elongate provide both an energy absorbing and a penetration resistant barrier.

With reference to FIG. 3, it can be seen that a sharp rock 34 or object coming into contact with the sidewall 12 in the area of the barrier layer 31 will penetrate the outer rubber 35 of the sidewall 12 between the outer surface 33 and the barrier layer 31. The rock 34, when it engages the nylon cord, will push the nylon barrier layer 31 toward the radial carcass ply 15 and further compress the rubber between the nylon barrier layer 31 and the carcass layer 15. The nylon being unstretched is capable of giving a certain amount and absorbing some of the energy of the impact without breaking or snapping as would be the case of substantially inextensible cords. The nylon further being very strong will also resist penetration or cutting by the rock 34, as illustrated in FIG. 3. Thus, it can be seen that the use of unstretched nylon cord crossed at a relatively high angle midway between the carcass layer and the outside surface of the tire provides a good energy absorbing, penetration resistant barrier. Since the barrier layer 31 prevents cuts and bruises from penetrating through the sidewall to the carcass 15, a tire having such a barrier layer and being damaged in the sidewall can be repaired and need not be scrapped.

In order to provide sufficient cut and bruise resistance in a tire, it is preferable that the barrier layer 31 extend from a point in the wedge of rubber 38 midway between the turn-up 16 and the radially outer ends of the chipper plies up the sidewall into the shoulder area 13. The extent of the barrier layer 31, of course, will be determined by the tire design engineer and how much of the sidewall is to be protected from bruise and cut penetration. At least one ply of the barrier layer 31, however, should extend at least from the turn-up 16 of the carcass ply 15 to the portion of the upper sidewall at which the rubber gage outwardly of the carcass ply is one-third greater than the minimum rubber gage elsewhere in the sidewall. The barrier layer 31 should not overlap the belt plies 22 or extend to a point adjacent the flange 20.

As mentioned before, the material used in the barrier layer 31 of the specific embodiment illustrated was unstretched nylon. However, it should be understood that other materials could be used in place of unstretched nylon. It is important, however, that the material used have a high tensile strength yet be able to give or stretch a certain amount. It has been found that the barrier layer should be comprised of parallel cords extending at an angle of between 80° and 88°. The specific stress at a 7 percent elongation should be at least 1.0 and no greater than 2.5 grams per denier. The tensile strength of the material, of course, is a design criteria to be determined by the tire designer. However, the higher the tensile strength of the cord the better resistance the barrier layer has to cut and bruise penetration. It is important, however, that the cords be relatively elastic in order to permit them to give under impact and absorb the energy of the tire striking the rock. In the specific embodiment illustrated, there are four plies in the barrier layer 31; however, it should be noted that two or more plies could be used.

While certain representative embodiments and details have been shown for the purpose of illustrating the invention, it will be apparent to those skilled in this art that various changes and modifications may be made therein without departing from the spirit and scope of the invention.

What is claimed is:

1. A pneumatic tire having a carcass of radial wire tire cords, a tread disposed circumferentially about said carcass, a pair of annular bead portions at the radially inner ends of said carcass, and a pair of sidewalls extending from said bead portions to said tread; said tire being characterized by a plurality of plies of tire cord fabric disposed in each sidewall and extending substantially from the bead portion to the tread portion and disposed about midway between the outer surface of the radial wire cords in said carcass and the outer surface of the sidewall and said plurality of plies having a cord angle of between about 80° and 88° and its cords having a low modulus of elasticity so that said plurality of plies do not substantially decrease the sidewall flexibility.

2. A pneumatic tire as claimed in claim 1, further including at least one belt ply disposed circumferentially about said carcass and beneath said tread and wherein said carcass ply is turned up around said bead portions and at least one ply of said plurality of plies overlaps the turned up portions of said carcass ply.

3. A pneumatic tire as claimed in claim 1, wherein said plurality of plies are comprised of tire cords having a specific stress at 7 percent elongation of at least 1.0 and not more than 2.5 grams per denier.

4. A pneumatic tire as claimed in claim 1, wherein the tire cord fabric in said plurality of plies is nylon.

5. A pneumatic tire as claimed in claim 2, wherein said cords in said plurality of plies are nylon.

6. A pneumatic tire as claimed in claim 2, wherein said plurality of plies comprise at least four plies of unstretched nylon tire cord fabric.

* * * * *